US006215533B1

(12) United States Patent
Shigeta et al.

(10) Patent No.: US 6,215,533 B1
(45) Date of Patent: Apr. 10, 2001

(54) FERROELECTRIC LIQUID CRYSTAL DRIVING USING SQUARE WAVE AND NON-SQUARE WAVE SIGNALS

(75) Inventors: Mitsuhiro Shigeta, Kashiwa (JP); Jonathan Rennie Hughes, St Johns (GB); Paul Bonnett, Littlemore (GB); Edward Peter Raynes, Oxford (GB); Akira Tagawa, Kashiwa (JP); Michael John Towler, Botley (GB); Harry Garth Walton, Wheatley (GB); David Scattergood, Droitwich (GB)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 08/854,559

(22) Filed: May 12, 1997

(30) Foreign Application Priority Data

May 17, 1996 (GB) .................................................. 9610313

(51) Int. Cl.$^{7}$ ...................................................... G02F 1/141
(52) U.S. Cl. ................................. 349/37; 345/97; 345/94
(58) Field of Search ................................. 349/36, 37, 33; 345/97, 94

(56) References Cited

U.S. PATENT DOCUMENTS 4,655,561 * 4/1987 Kanbe et al. .......................... 345/97
4,917,470 4/1990 Okada et al. ........................ 350/333
4,923,285 5/1990 Ogino et al. ......................... 350/331
5,319,381 * 6/1994 Mourey et al. ...................... 345/100
5,489,918 * 2/1996 Mosier .................................. 345/89

FOREIGN PATENT DOCUMENTS 0397260 11/1990 (EP) .
0464807 1/1992 (EP) .
0499101 8/1992 (EP) .
0701241 3/1996 (EP) .
2064194 6/1981 (GB) .
2077974 12/1981 (GB) .
2118346 10/1983 (GB) .
2193366 2/1988 (GB) .
2207272 1/1989 (GB) .
2262831 6/1994 (GB) .
61-223793 10/1986 (JP) .
02067521 3/1990 (JP) .
580297 4/1993 (JP) .
9524715 9/1995 (WO) .

OTHER PUBLICATIONS

Search Report for EPO Application No. 97303365.7; Dated Oct. 16, 1997.

P.W.H. Surguy et al., Ferroelectrics, 1991, vol. 122, pp. 63–79, "The 'Joers/Alvey' Ferroelectric Multiplexing Scheme".

J.R. Hughes et al., Liquid Crystals, 1993, vol. 13, No. 4, pp. 597–601, "Preliminary Communications—A Net Set of High Speed Matrix Addressing Schemes for Ferroelectric Liquid Crystal Displays".

Search Report for Application No. GB 9610313.0; dated Aug. 9, 1996.

* cited by examiner

*Primary Examiner*—Kenneth Parker
(74) *Attorney, Agent, or Firm*—Renner, Otto, Boisselle & Sklar LLP

(57) ABSTRACT

A ferroelectric liquid crystal device includes a layer of ferroelectric liquid crystal material contained between a pair of substrates, a first plurality of electrodes and a second plurality of electrodes defining a plurality of addressable liquid crystal pixels. A driving arrangement is provided for applying a first signal (Strobe) in succession to the first plurality of electrodes and for applying a plurality of second signals (Data) simultaneously to the second plurality of electrodes. The plurality of second signals are arranged to include non-rectangular wave signals which have a lower harmonic content than a rectangular wave. Non-uniform heating of the device as a result of the application of the second signals (Data) is reduced with consequent improvement in device performance.

34 Claims, 10 Drawing Sheets l.a.t

TIME SLOT l.a.t.

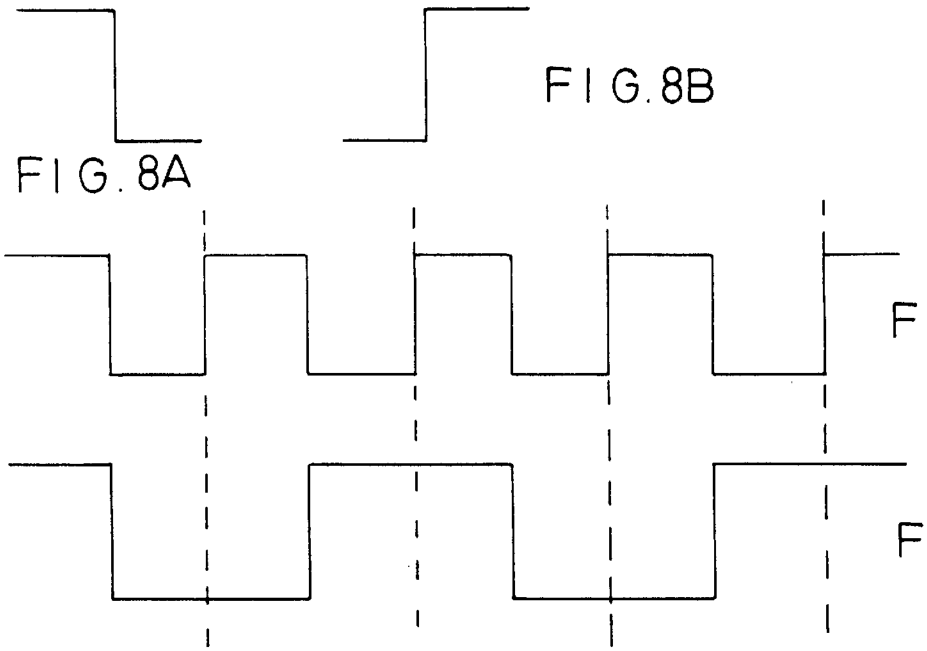
FIG. 8A
FIG. 8B
FIG. 8C
FIG. 8D
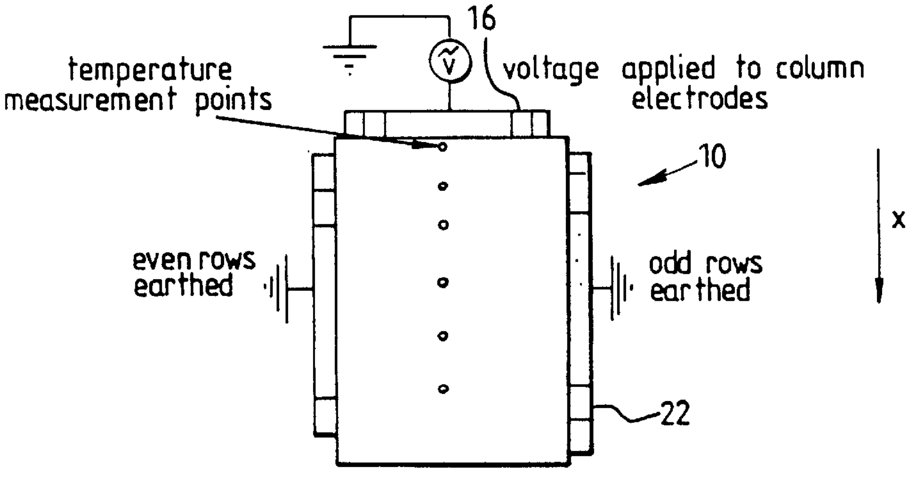
FIG. 10

FERROELECTRIC LIQUID CRYSTAL DRIVING USING SQUARE WAVE AND NON-SQUARE WAVE SIGNALS

FIELD OF THE INVENTION

The present invention relates to a ferroelectric liquid crystal device such as a large area flat panel display including a driving arrangement for reducing adverse effects caused by non-uniform heating of the device. The invention further relates to a driving arrangement for a ferroelectric liquid crystal array device and to a method of driving a ferroelectric liquid crystal array device.

BACKGROUND OF THE INVENTION

Ferroelectric liquid crystal materials are of important application to flat panel liquid crystal array devices because of their high switching speed and bistability. Unlike supertwist nematic liquid crystal devices, for example, the pixels of such a device will remain in a particular state without continued application of a particular drive voltage. In a large area panel display device which has to be addressed by multiplexing this is a significant advantage. Ferroelectric liquid crystal arrays and a driving scheme therefor are described in 'The JOERS/Alvey Ferroelectric Multiplexing Scheme' published in *Ferroelectrics,* 1991, Vol.122 pages 63 to 79. In such driving schemes a liquid crystal array has a first and second set of driving electrodes arranged at right angles to each other defining a matrix. A plurality of pixels are defined at the intersection of an electrode from the first plurality and an electrode from the second plurality. However, by the very nature of this layout, it is not possible to address each pixel individually. The type of addressing scheme used most commonly applies a strobe signal in sequence to one of the sets of electrodes (referred to hereafter as the row electrodes) while applying the relevant data signals for the currently-strobed row to the second set of electrodes (hereafter referred to as the column electrodes).

One consequence of such a scheme is that the data signals applied to the column electrodes are applied to every pixel in the respective column, even though only one pixel in the column is actually being addressed at any one time. In a ferroelectric display it is not feasible to remove such signals (for example by open-circuiting the non-strobed row column electrodes) because they are required to apply an AC stabilisation signal to the pixels of the array. Such a signal prevents the liquid crystal molecules in the array relaxing to a position which has an unfavourable optical performance. These signals, however, are continually applied at a high frequency to every column electrode to drive a capacitive load including the pixels of the device. The column electrodes generally include transparent indium tin oxide (ITO) tracks which have a certain resistance so the charging and discharging of the pixels dissipates power in these tracks which heats the device.

The temperature of the device is particularly critical in a ferroelectric liquid crystal array device because of the large temperature sensitivity of ferroelectric materials themselves. To some extent effects of global temperature changes to the device can be compensated for in the addressing waveforms. For example changes in the switching speed (operating region) can be compensated for by changing the shape or amplitude of the strobe voltage, whilst changes in the angle of the director in an AC stabilised position can be compensated for by changing the amplitude of the column (data) waveforms. However, the prior art drive schemes such as the one described in the reference above, apply rectangular waves to the column electrodes to drive the device and these waveforms have a rich harmonic content including substantial frequency components at high multiples of the fundamental frequency. Since each column of the array appears as a distributed RC ladder to the driving circuitry, these higher harmonics of the driving waveform are attenuated heavily by the device and the highest attenuation occurs at the driven end of the column electrodes, in other words at the edge of the device. This causes non-uniform heating of the device that cannot be compensated by adjusting the row or column signals (since they clearly apply to all of the pixels in a column). The consequence of this is variations in contrast or colour over the array display device (or, in extreme cases failure to switch when addressed) which is unacceptable. Liquid crystal devices based on nematic liquid crystal phases do not suffer from these problems because of their higher tolerance of temperature variations.

SUMMARY OF THE INVENTION

It is an object of the present invention to ameliorate the above problem in ferroelectric liquid crystal devices.

It is a further object of the invention to provide a novel driving arrangement for a ferroelectric liquid crystal array device and to provide a novel method of driving such a device.

According to a first aspect of the present invention there is provided a ferroelectric liquid crystal device including a layer of ferroelectric liquid crystal material contained between a pair of substrates and a first plurality of electrodes and a second plurality of electrodes defining a plurality of addressable liquid crystal pixels and a driving arrangement for applying a first signal in succession to the first plurality of electrodes and for applying a plurality of second signals simultaneously to the second plurality of electrodes, wherein the plurality of second signals include non-rectangular wave signals which have a lower harmonic content than a rectangular wave.

According to a second aspect of the present invention there is provided a driving circuit for a ferroelectric liquid crystal device which device includes a matrix of liquid crystal cells addressable via a plurality of row electrodes and a plurality of column electrodes, the driving circuit including row driving means for applying a first signal in succession to the plurality of row electrodes and column driving means for simultaneously applying a plurality of second signals, which second signals each include one of at least two data signals, to the plurality of column electrodes, wherein at least the means for applying a plurality of second signals provides a signal, at least a portion of which signal has a substantially continuously varying level.

According to a third aspect of the present invention there is provided a method of driving a ferroelectric liquid crystal device which device includes a matrix of liquid crystal cells addressable via a plurality of row electrodes and a plurality of column electrodes, the method including driving the rows of the device by applying a first signal in succession to the plurality of row electrodes and driving the columns of the device by simultaneously applying a plurality of second signals to the plurality of column electrodes, which second signals each include one of at least two data signals, wherein at least a portion of the data signals has a substantially continuously varying level.

The present invention is based upon the realisation that the non-uniform heating of a ferroelectric liquid crystal device as described above can be reduced considerably by driving the column electrodes with a signal that is substantially lower in harmonic content than the rectangular wave type driving waveforms of the prior art technologies. Particular non-rectangular waveforms of interest are sinusoidal waveforms, triangular waveforms and trapezoidal waveforms. The sinusoidal waveform clearly has the lowest harmonic content of the three: ideally being zero above the fundamental frequency. However, the higher harmonic content of the other two waveforms is low and these waveforms have the advantage that they can generally be provided with simpler circuit arrangements than can a suitable sinusoidal waveform. If, for example, the waveforms are provided by a digital circuit connected to a digital to analogue converter (D/A), a triangular waveform can be generated by an up-down counter connected to the D/A. A sinusoidal waveform would generally require a memory containing a large number of sample values for feeding to the D/A. A trapezoidal signal could be provided using a smaller number of sample values. As the number of sample values is increased the waveform can be made to better approximate a sinusoidal wave. This provides better performance but at greater cost and complexity of the driving circuitry. Signals having no effective harmonic content above the fifth harmonic of the fundamental exhibit good performance. Such signals can generally also be generated by simpler circuitry than a sinusoidal waveform since they have fewer distinct voltage levels and larger amounts of time between voltage changes. Signals of this harmonic content are thus a good compromise between performance and cost.

European Patent Application Publication no. 0397260 describes driving a liquid crystal array using sinusoidal signals but this prior art reference relates to nematic displays in which pixels react to the cumulative effect of drive pulses. Consequently, there is no discernible difference in appearance between an array driven using sine waves or rectangular waves. There is no teaching regarding the driving of ferroelectric liquid crystal devices.

Neither is there any teaching of ferroelectric liquid crystal devices in United Kingdom Patent Application Publication no.2193366 which describes displays driven by trapezoidal signals. The signals have amplitudes of +/− 200 V and are thus not suitable for driving ferroelectric liquid crystal materials. In addition, the prior patent application is concerned with difficulties arising from the use of high voltages.

The present invention also has these further advantages:

(i) the total power dissipation in the panel is reduced, making it less susceptible to overall temperature-related effects, (ii) the attenuation of the column waveforms along the ITO tracks is reduced which means that the waveform applied to the cells most distant from the drive circuitry is less distorted and so the switching of the pixels between states is more reliable, and (iii) the power dissipated is less dependent upon the pixel pattern (in other words the image displayed) which further reduces undesirable temperature-related effects.

The strobe waveform applied to the row electrodes may also be provided to be a reduced-harmonic waveform but this is not as desirable as providing reduced-harmonic waveforms to the column electrodes. The strobe waveform is applied to each row only for the time that the row is being addressed which in a large panel array is a very short period of time. Thus the heating effects of this waveform are not nearly as significant as those of the waveforms applied to the column electrodes. It is not generally worthwhile to provide the more sophisticated drive circuitry for the row driving arrangement. In addition, if the strobe waveform is of a sinusoidal shape then the operating region (discussed in greater detail hereinafter with reference to FIG. 7A) may be shifted to higher peak voltages than for that of a rectangular strobe waveform.

As mentioned above, however, it is not necessary to apply a pure sinusoid to the column waveforms to obtain the advantages of the present invention. A range of waveforms may be applied that have a reduced higher-harmonic content compared with a rectangular wave. Waveforms that provide the advantages of the invention can be defined in terms of their harmonic content and their interaction with the other parameters of the liquid crystal device. For example, the waveform may be defined in terms of its power dissipation when applied to the panel or the distortion of the waveform along the length of the electrodes.

For a fuller understanding of the nature and advantages of the invention, reference should be made to the ensuing detailed description taken in conjunction with the accompanying drawings.

BRIEF DESCRIPTION OF THE DRAWINGS

FIG. 7A shows a graph of switching time against applied voltage (a so-called TV graph) for a ferroelectric liquid crystal display in accordance with the invention while FIGS. 8A to 8D show a pair of prior art data waveforms and a pair of data waveform streams for illustrating a further advantage of the invention, FIG. 10 is a block schematic diagram of a rig for testing the present invention.

DESCRIPTION OF THE EMBODIMENTS

Figure 1:
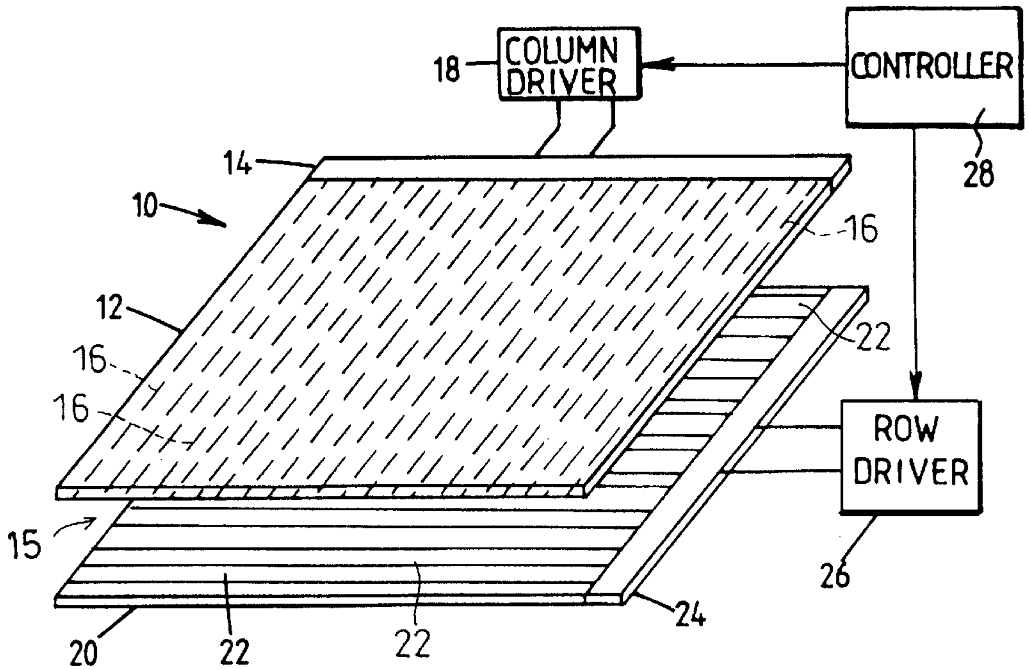
FIG. 1 shows a block schematic diagram of a ferroelectric liquid crystal flat panel display and driving circuitry.

FIG. 1 shows a ferroelectric liquid crystal array device 10 including a first transparent substrate 12 and a second transparent substrate 20 spaced apart from the first substrate by known means such as spacer beads (not shown). The substrate 12 carries a plurality of electrodes 16 (shown in broken lines) of transparent indium tin oxide on that surface of the substrate that faces the second substrate 20. The electrodes 16 are arranged parallel to one another and each extend between a first edge of the substrate 12 and a second edge at which an electrical connector 14 is arranged to connect each electrode to a column driver 18. The substrate 20 carries a plurality of transparent electrodes 22 also arranged in parallel with one another but at right angles to the electrodes 16 on the first substrate. The electrodes 22 extend from a first edge of the substrate 20 to a second edge at which an electrical connector 24 links them to a row driver 26. Both the row driver 26 and the column driver 18 are connected to a controller 28 which will typically include a programmed microprocessor or an application specific integrated circuit (ASIC). Other electrode configurations can be applied to the liquid crystal device to provide, for example, a seven segment display, an r, θ display and so on. The liquid crystal device will include a liquid crystal layer 15 of a ferroelectric liquid crystal material such as SCE8 (Merck Ltd., Merck House, Poole U.K.—now available from Hoechst Aktiengesellscaft, Frankfurt am Main, Germany) and will also include polarising means and alignment layers (not shown) as is known to those skilled in the art. Alternate electrodes on each substrate of the device may be connected to the row and column drivers at opposite edges of the substrates.

Figure 2:
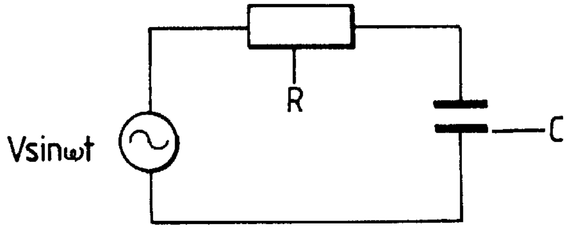
FIG. 2 shows a lumped equivalent circuit of a ferroelectric liquid crystal device.

Each of the column electrodes of the liquid crystal array of FIG. 1 effectively includes a large capacitance driven by a voltage source via a resistance. A lumped equivalent circuit is shown in FIG. 2 which shows an AC voltage Vsin ωt applied across a resistor R and a capacitor C connected in series. It will be understood that the dissipation of power in the resistor is dependent upon the angular frequency ω of the voltage applied. At higher frequencies the impedance of the capacitor is smaller causing a greater voltage to be dropped across the resistor R leading to a higher power dissipation. Similarly for higher frequencies a reduced voltage is present across the capacitor (i.e. the liquid crystal pixel) reducing both contrast ratio and switching discrimination. The average power dissipated by such a circuit is given by:

$$(P)=\frac{\omega^2C^2V^2R}{2(1+\omega^2R^2C^2)}$$

From this equation it can be seen that the power dissipation is heavily dependent upon the angular frequency ω when driven by a sinusoid. When driven by a rectangular wave the average power dissipation is:

$\langle P\rangle=4CV^2/\text{l.a.t.}$ (l.a.t. represents the inverse of the addressing speed and is explained below)

Figure 3:
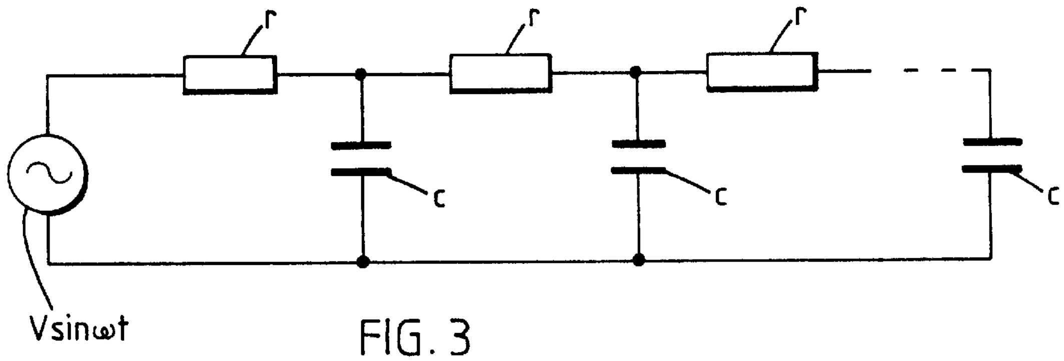
FIG. 3 shows a distributed equivalent circuit of a ferroelectric liquid crystal device.

FIG. 3 shows a distributed, or transmission line model, of a column electrode in which a plurality of series-connected resistances r are connected as a ladder in which a plurality of capacitors c include the rungs. The equivalent circuit is driven by a voltage Vsin ωt as before. The average power dissipated in this arrangement is given by:

$$(P)=\frac{V_0^2}{2}\sqrt{\frac{\omega c}{2r}}\left\{\frac{\sin h\sqrt{2\omega rc}-\sin\sqrt{2\omega rc}}{\cos h\sqrt{2\omega rc}+\cos\sqrt{2\omega rc}}\right\}$$

and the voltage drop along the electrode track is:

$$\frac{v}{V}=\frac{2\exp\left(-\frac{\sqrt{\omega rc}}{2}\right)}{\sqrt{1+2\exp(-\sqrt{2\omega rc})\cos(\sqrt{2\omega rc})+\exp(-2\sqrt{2\omega rc})}}$$

In which v is the voltage applied to the furthest pixel from the input terminal.

The power dissipation for this equivalent circuit remains the same as for the lumped circuit model when the electrode track is driven by a rectangular wave, at:

$\langle P\rangle=4CV^2/\text{l.a.t.}$

From the equation for the voltage drop along the electrode track, however, it can be seen that the higher angular frequency components suffer a large reduction in voltage along the track. The power contained in these components is therefore dissipated at the beginning of the track which is at the edge of the panel. Consequently the edge of the panel gets hotter than the remainder of the panel. Even if the column electrode signals are applied at alternate edges of the panel a rather uneven temperature will exist over the panel. By reducing the amplitude of the higher angular frequency components in the column drive signals with respect to a rectangular wave, the non-uniformity of heating is reduced.

Furthermore, it is known to reduce the effective resistance of the electrode tracks in a ferroelectric liquid crystal display by providing a low resistance element alongside the transparent electrode. Although such a low resistance element will not usually be transparent it can be very narrow and placed in the inter-pixel gap in a display. This can reduce the effective resistance of the track markedly. However, when the column electrodes are driven by rectangular wave signals, there is no reduction in the heating of the panel because the dissipation of power for rectangular wave drive is independent of the resistance (see equation above). However, as will be appreciated from the equation for power dissipation in the distributed circuit model, when a sinusoidal waveform or a waveform including predominantly lower-order harmonics is applied to the column electrodes, the resistance r does have an effect on dissipated power. Thus by applying the column waveforms in accordance with the invention to a liquid crystal array device having reduced resistance electrode tracks a further reduction in the overall heating of the device can be achieved.

Figure 4A:
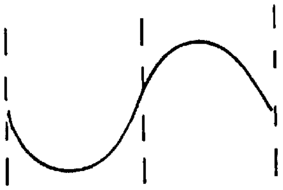
FIGS. 4A to 4F show three possible pairs of select and non-select waveforms which may be applied to the column electrodes of a liquid crystal array in accordance with the invention.

FIG. 4A shows a first drive waveform for the column electrodes of the present invention. The waveform is a sinusoid having a period of one line address time or l.a.t. The l.a.t. is the time that spent addressing a particular row of the display and in simple drive schemes is the duration of the strobe pulse applied to the row. However, more sophisticated drive schemes use a strobe pulse that overlaps for two adjacent rows (see, for example U.K. Patent number 2,262,831) so is it better to define the l.a.t. as the frame time for addressing the whole array divided by the number of rows, thus:

l.a.t.=1/(frame rate multiplied by number of lines addressed per frame) for a ferroelectric liquid crystal device this will typically be 25 μs or less.

Figure 4B:
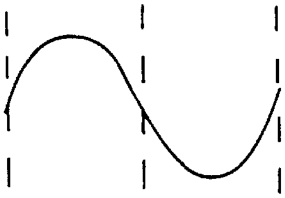
Figure 6:
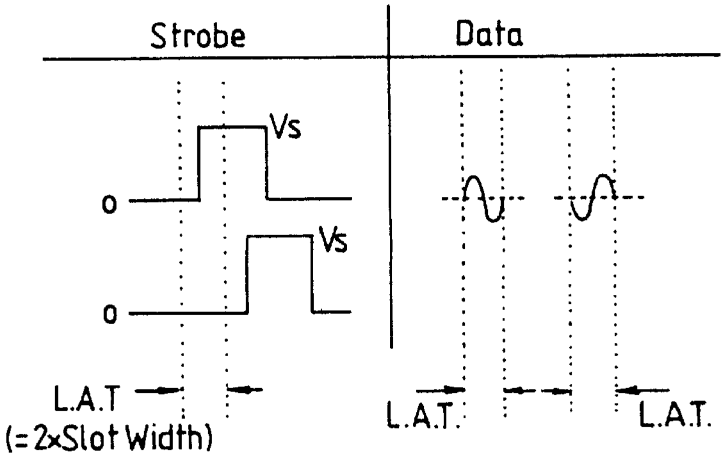
FIG. 6 shows strobe and column (data) waveforms for application to a panel in accordance with the present invention.

The l.a.t. shown in FIG. 4A is divided into two equal time slots and for this reason the driving scheme is known as a two slot scheme. More complex schemes, for example a four slot scheme, exist but for the sake of simplicity the present part of the description will concentrate on a two slot scheme. As shown in FIG. 6, the strobe signal will generally include an amplitude of zero in the first slot and a positive-going rectangular wave pulse in the second slot. The resultant waveform applied to those pixels that are actually being addressed is the combination of these two signals. Two data waveforms are required to provide a resultant signal that will cause the pixel to change state and a resultant signal that will not cause the cell to change state receptively. The two data waveforms are often the inverse of each other so FIG. 4B shows an inverted sinusoidal waveform which includes the other data (column) signal.

Figure 4C:
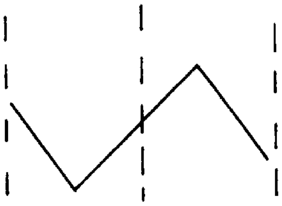
Figure 4D:
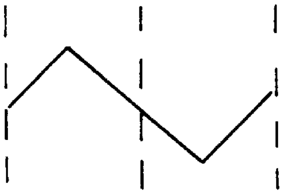
Figure 4E:
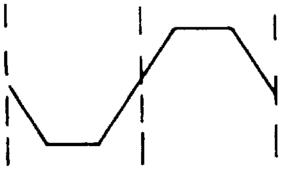
Figure 4F:
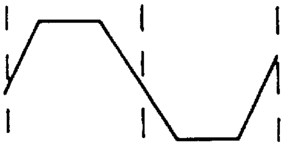

FIGS. 4C and 4D show a pair of data waveforms having a triangular shape. In combination with a suitable strobe signal, one of these two waveforms will cause the relevant pixel to switch state while the other waveform will leave the pixel in its original state. FIGS. 4E and 4F show another pair of data waveforms, again inverses of one another, based upon trapezoidal waveforms. All of these waveforms have a considerably reduced higher harmonic content compared with a rectangular wave and so provide a more even heating of the display device panel. The magnitude of these voltages is preferably as low as possible commensurate with accurate and reliable switching of the device. The R.M.S. voltage will be less than 20 volt and typically between 5 volt and 10 volt.

Figure 5:
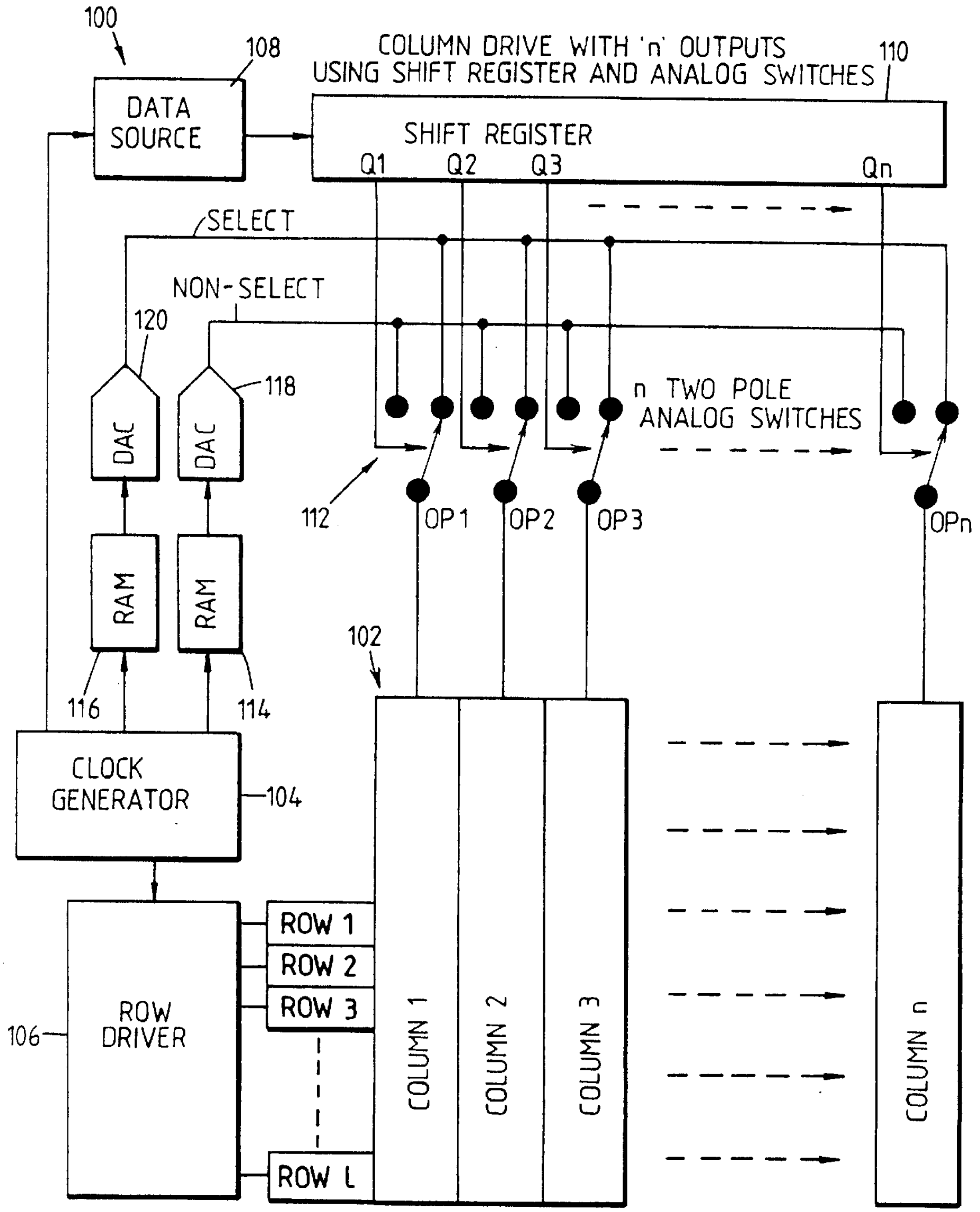
FIG. 5 shows a block schematic diagram of a driving arrangement for applying signals to the column electrodes in accordance with the present invention.

FIG. 5 shows a block schematic diagram of a driving arrangement 100 for applying data waveforms in accordance with the present invention. A ferroelectric liquid crystal array 102 includes a plurality of columns numbered 1 to n of which numbers 1, 2, 3 and n are shown. The driving of the array is controlled by a clock generator 104 which governs the timing of the signals applied to the array. The clock generator 104 is connected to a row driver 106 which is connected to all of the rows of the array to provide the strobe signals at the correct time to the appropriate row.

The clock generator is also connected to a data source 108 which provides the data relating to the desired state of each pixel in a particular row for each application of the strobe signal. A signal from the clock generator 104 clocks this data into a shift register 110 every time that a new row is addressed. The shift register has n outputs Q1 to Qn, in other words one for each column of the display, and each of these outputs controls one of n analogue switches 112. Under the control of the outputs of the shift register 110, the analogue switches couple either a SELECT or a NON-SELECT data signal to their respective columns of the array. The SELECT data signal is provided by a digital to analogue converter (DAC) 120 which is provided with digital data from a random access memory (RAM) 116. The NON-SELECT data signal is provided by a DAC 118 provided with digital data from a RAM 114. The RAM 116 and the RAM 114 contain digitised versions of the SELECT data and NON-SELECT data waveforms shown in FIGS. 4A to 4F. The RAMs are addressed by the clock generator 104 providing a parallel signal which counts up at a fast rate to clock the digital signals representing the data signals out of the RAMs. The DACs convert these signals into a pair of substantially continuously varying signals which are applied to respective poles of the switches 112. The relevant data waveform is selected from the outputs of the DACs by the plurality of switches 112. Each switch has an output OP1, OP2, OP3, . . . , OPn which are connected to the columns of the array. Thus the required combination of strobe waveform and data waveform can be applied to each pixel in the array. The RAMs must be clocked at a sufficiently high rate and the RAM/DAC combination must be of high enough resolution to mimic the desired switching waveform accurately. Some examples of suitable circuitry are as follows. The RAM may include part number CY7C128-45PC from Cypress Semiconductor which provides 2 k×8 bit of memory with an access time of 45 ns. The DAC may include part number DAC08CP which has an 8 bit current output with an 85 ns settling time although this may need a current to voltage converter. Alternatively, the DAC may include part number OPA 600 available from Burr-Brown which provides a +/−10 v output and a settling time to 0.1% of 80 ns. This combination of circuitry will give 256 voltage steps and 100 time steps in a 10 μs time slot if it is clocked at 10 MHz.

Figure 12:
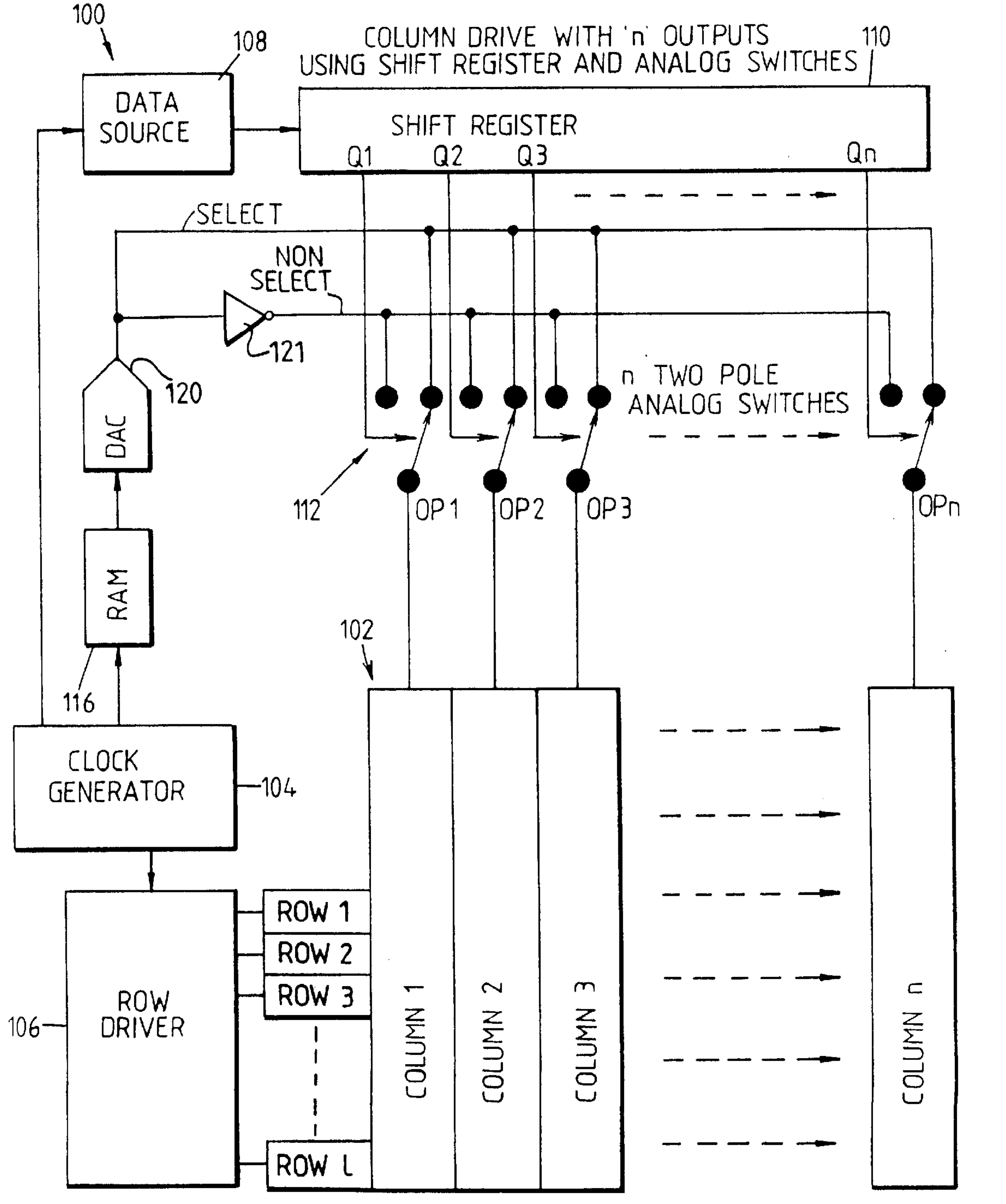
FIG. 12 shows a modification of the arrangement shown in FIG. 5.
Figure 13:
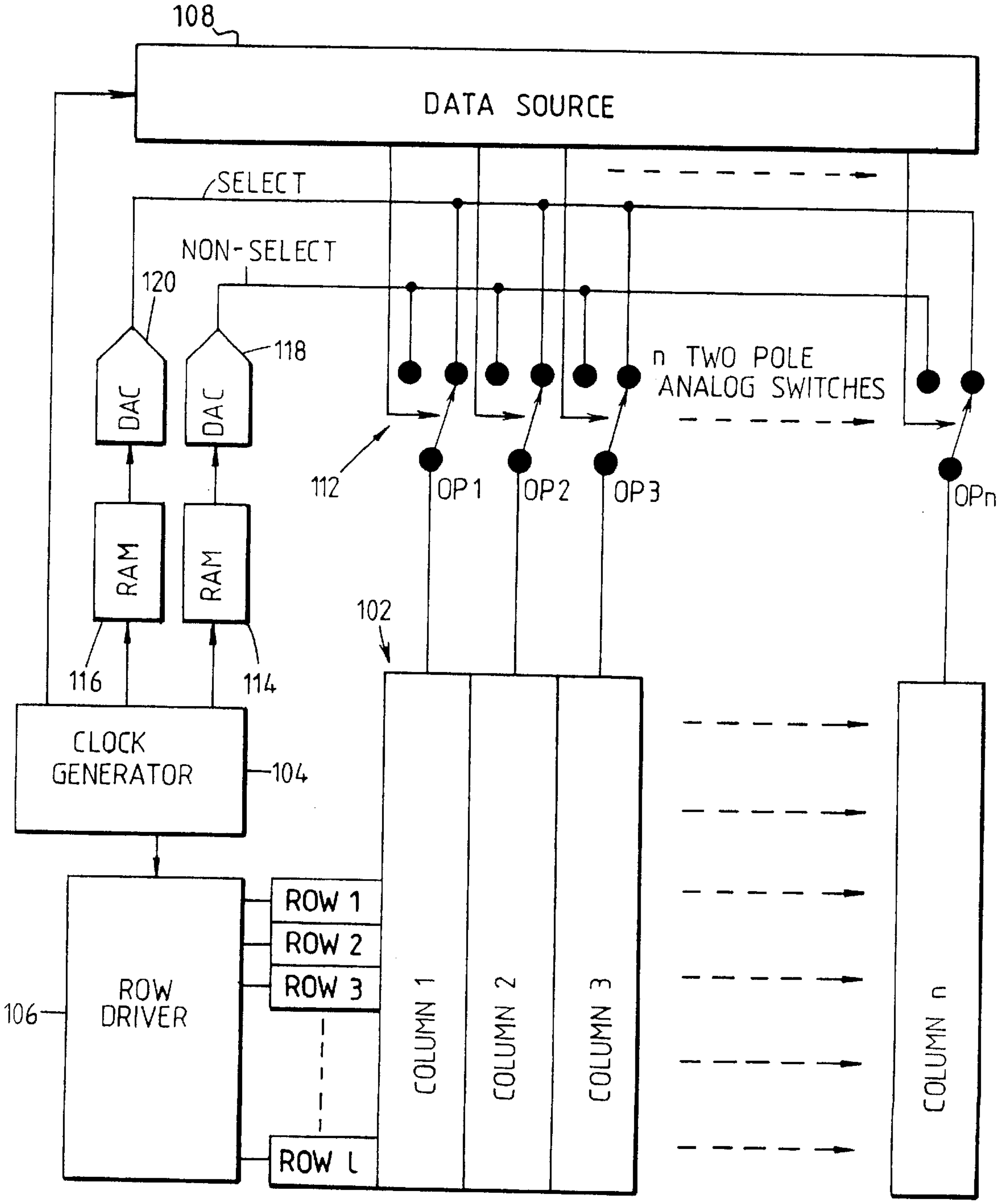
FIG. 13 shows another modification of the arrangement shown in FIG. 5.

The row driver may be arranged to provide a bi-directional strobe or, alternatively, a blanking pulse ahead of the application of the strobe signal as is known in the art. The blanking pulse is chosen to switch the pixels in a particular row into a given state regardless of the data waveform applied to the cell at that instant. As is known the blanking pulse allows the array to be driven using a strobe signal having a mono-polar pulse. The blanking pulse is typically applied 5 to 10 rows ahead of the strobe signal.

Where the SELECT data waveform and the NON-SELECT data waveform are inverted versions of each other such as shown in FIGS. 4A to 4F then the RAM 114 and the DAC 118 can be omitted. As shown in FIG. 12 the NON-SELECT waveform may be derived from the SELECT waveform by using an inverting buffer 121 connected to the output of the DAC 120. Where the data source 108 can provide the required data in a parallel format, the shift register 110 may be omitted and the data source 108 connected to control the analogue switches 112 directly. FIG. 13 shows such an arrangement. The clock generator 104 may also be provided with means to alter the data waveforms in response to operational data from the liquid crystal device array. For example, it may be desired to change the amplitude and/or the shape of the data waveforms as the array becomes hotter in use. This can be readily achieved by providing the data corresponding to the further waveforms in the RAM and altering the addressing of the RAM to output the modified data waveform as appropriate. A connection could be provided between a temperature sensing circuit and one or more of the address bits of the RAM. Methods by which the data compensation alters to effect such correction are beyond the scope of the present description. Further details are available, inter alia, from: International Patent Application Publication number WO95/24715, United Kingdom Patent Publication number GB2207272 and U.S. Pat. No. 4,923,285.

It is also possible to provide the appropriate SELECT and NON-SELECT data waveforms by analogue means, particularly for the case of a sinusoidal waveform. One such circuit is a waveform generator integrated circuit part number ICL 8038 available from Harris Semiconductor. This can provide both sine and triangle waveforms from 0.001 Hz to 100 kHz using voltage control of frequency. Using a digital signal generating arrangement as shown in FIG. 5, however, will generally be easier and more flexible.

FIG. 6 shows a strobe signal and a pair of data signals in accordance with the invention. In this case the strobe signal has a zero-voltage portion that occupies one slot width and a positive-going voltage portion which occupies three slot widths. The strobe signal is twice as long as the l.a.t. The two alternative data waveforms are sinusoids occupying two time slots each and being inverted versions of each other. Although it is not strictly to scale, FIG. 6 also gives an impression of the relative amplitudes of the strobe and data waveforms. If the upper strobe waveform in FIG. 6 is applied to the k-th row, the lower waveform is applied to the (k+1)-th row.

Figure 7A:
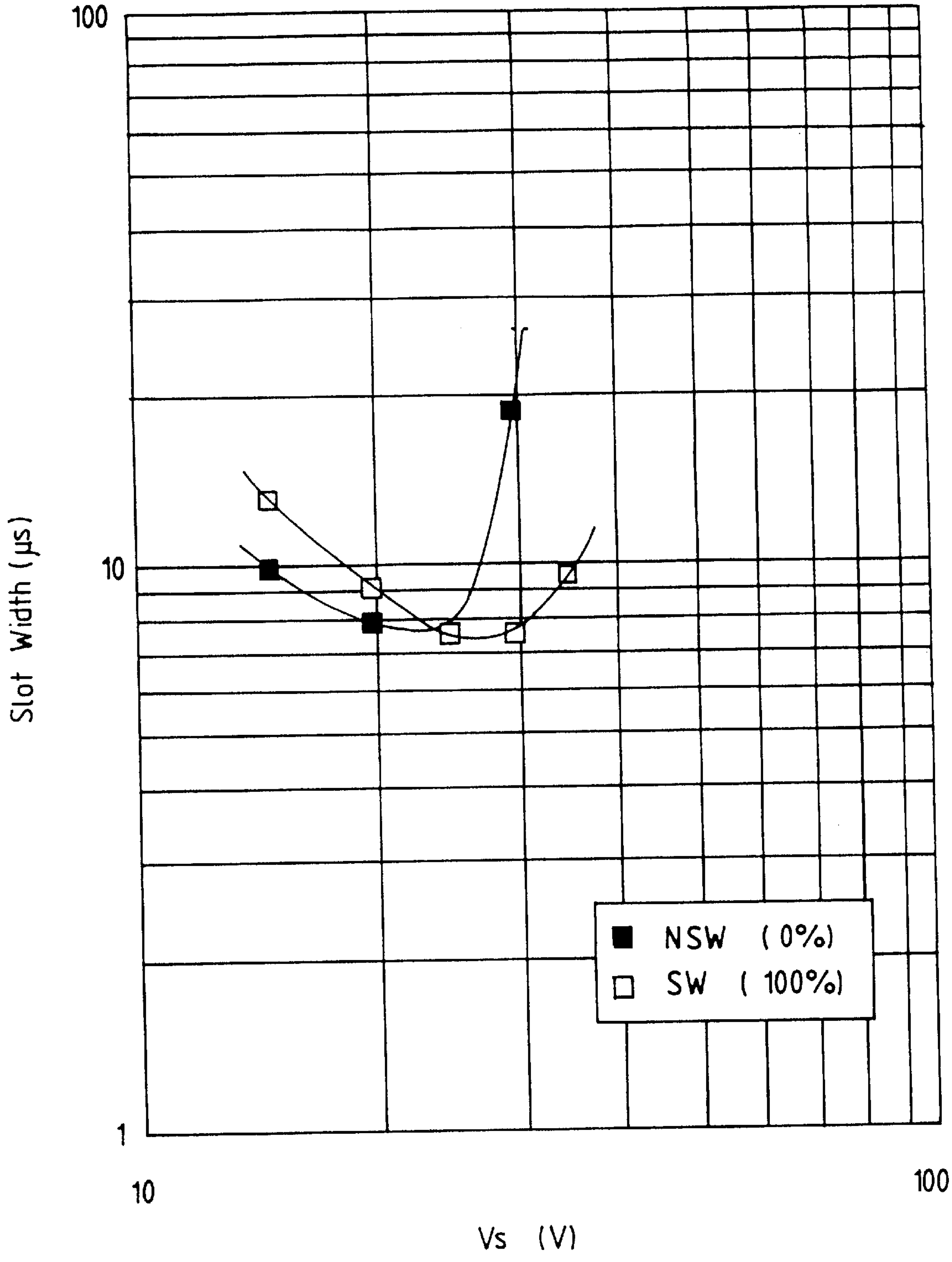
Figure 7B:
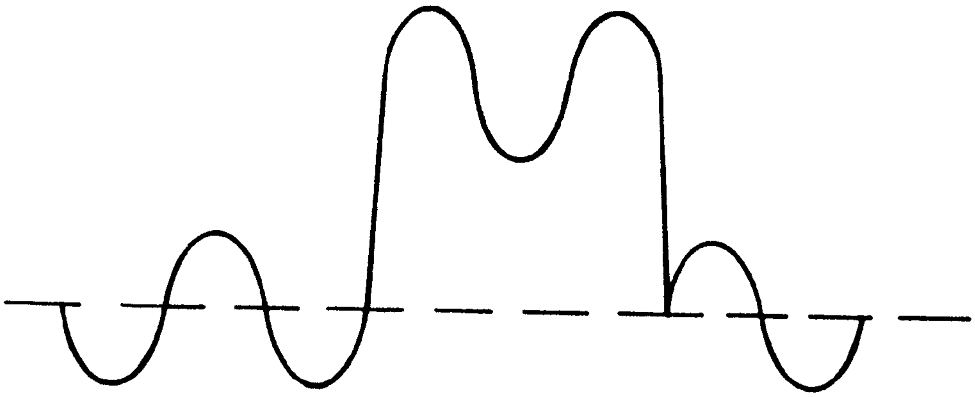
FIGS. 7B and 7C show the relevant waveforms.
Figure 7C:
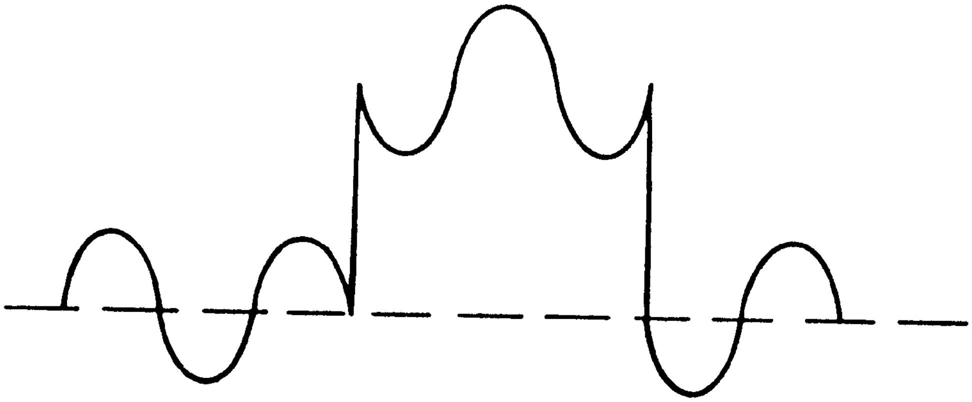

FIG. 7A shows a graph of the operating region of a ferroelectric liquid crystal array device driven using the waveforms shown in FIG. 6. The vertical axis indicates the switching time of the pixels in the device measured as the slot width of the applied signals in microseconds. The horizontal axis is the applied peak strobe (row) voltage. The two curves on the graph are each associated with a diagram of a waveform which is the resultant signal applied to a cell. In the case of the curve identified using solid squares it is the NON-SELECT waveform and the curve shown in FIG. 7B represents a suitable τV curve for NON-SWITCHING driving of the cell. The curve represented by hollow squares relates to the resultant waveform shown in FIG. 7C which is for SWITCHING driving of the cell. The curve represents a suitable τV combination for this waveform. This graph illustrates a good switching margin and discrimination between switched and unswitched states for ferroelectric liquid crystal device operation. For example if the panel is driven at 10 μs slot width then operation with a strobe voltage between approximately 27 and 36 volt is possible, allowing for some variations (such as thickness or waveform distortion) over the panel area. The percentages shown on the graph are explained below.

A black pixel does not always completely turn white with application of a voltage having a certain waveform: a part of it remains black. SW(100%) represents a driving condition, free from such inconvenience, under which the whole pixel turns white regardless of the waveform of the applied voltage. On the other hand, a black pixel does not always completely remain black with application of a voltage having a certain waveform: a part of the black pixel turns white. NSW(0%) represents a driving condition, free from such inconvenience, under which the whole pixel remains black regardless of the waveform of the applied voltage.

The present invention also provides an improvement in so-called pixel-pattern dependent heating of the ferroelectric display device. This phenomenon is not widely recognised and so will be described briefly here.

When one of two data waveforms may be applied to address the successive rows of an array device, the signal applied to the column electrode will either be the same for addressing successive rows or it will change if the adjacent pixels in the column are in different states. So, if adjacent pixels in a column are all black (say) the waveform applied to the column will be a continuous sinusoid for the data waveforms shown in FIGS. 4A and 4B. Where the adjacent pixels are black, white, black, white and so on the data waveform applied to the column electrodes will invert for successive rows. FIGS. 8A and 8B show a pair of data waveforms according to the prior art (rectangular wave type). FIG. 8C shows the data waveform applied to the column of a liquid crystal array when adjacent pixels in a column are black, black, black, black (say) and FIG. 8D shows the data waveform applied when adjacent pixels are black, white, black, white respectively. The latter waveform in FIG. 8D has double the wavelength (at the fundamental frequency) of that shown in FIG. 8C. From the discussion above regarding heating of a panel, it will be understood that the former waveform results in rather more power dissipation than the latter and hence more heating of the panel. Thus the panel heating depends to some extent on the pattern displayed, leading to pattern dependent heating.

Figure 9A:
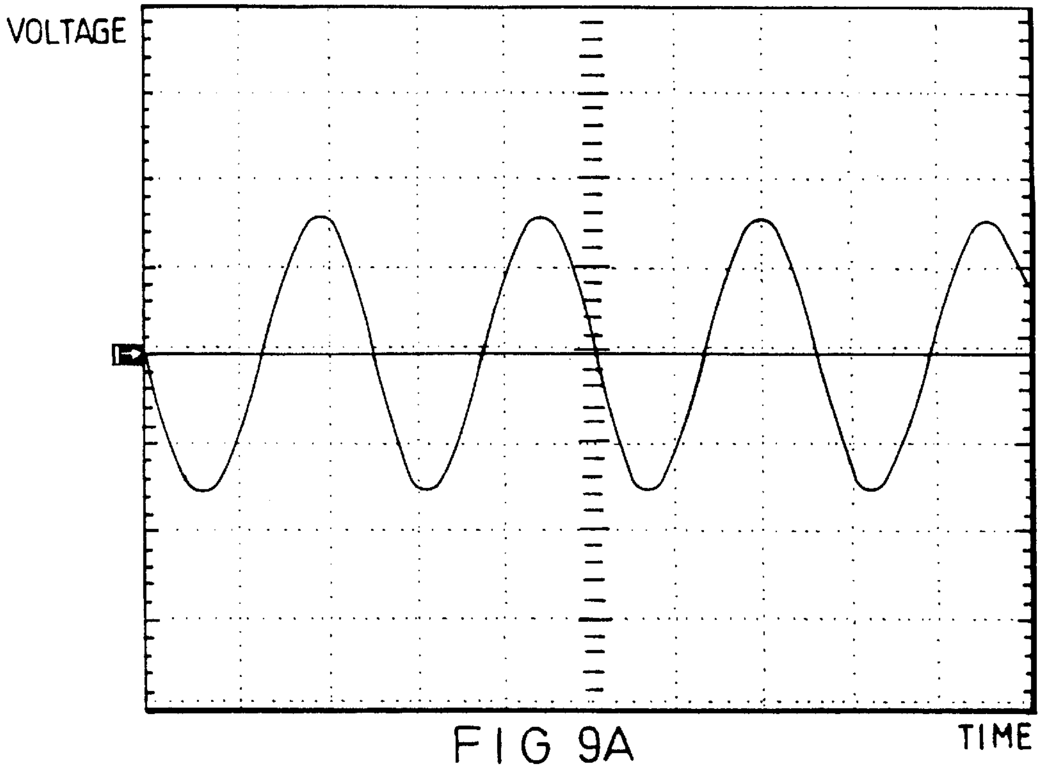
FIGS. 9A and 9B show the equivalent waveforms to those of FIGS. 8C and 8D for the present invention.
Figure 9B:
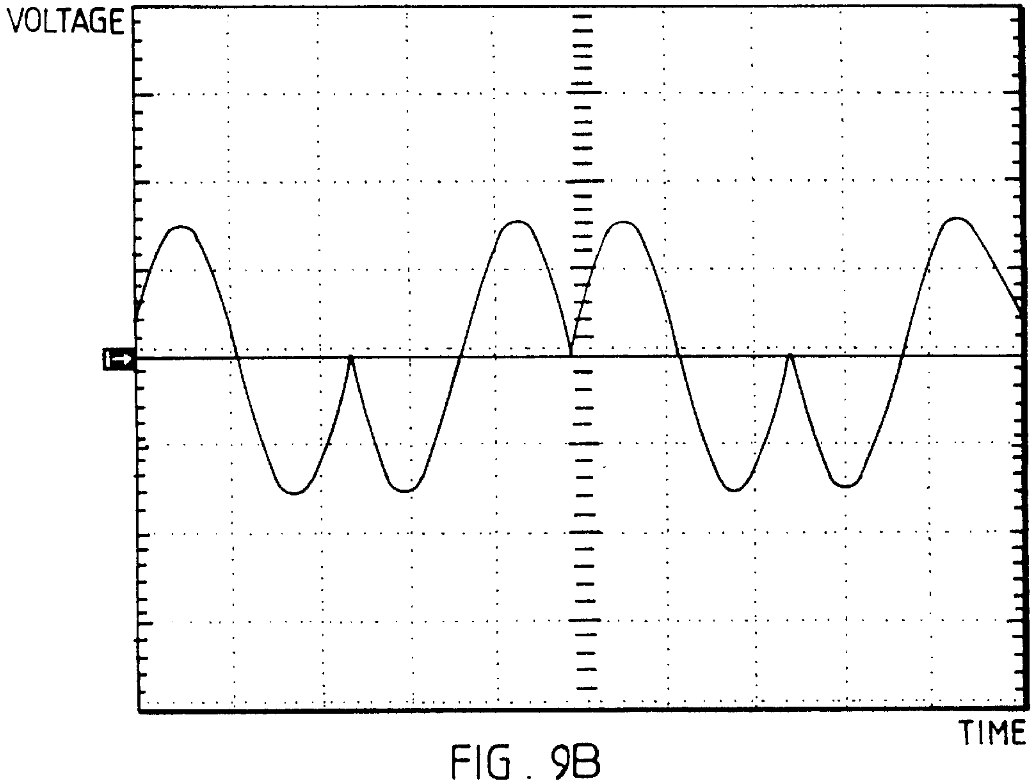

FIG. 9A however, shows the corresponding waveform for pixel patterns of black, black, black, black and FIG. 9B shows the corresponding waveform for black, white, black, white when the data waveforms include sinusoidal waveforms in accordance with the present invention. The first waveform is a pure sinusoid while the second waveform is sinusoidal in shape but inverts every 1.a.t.

The heating power of the two waveforms shown in FIGS. 9A and 9B is almost identical and this can be confirmed as follows. The waveform shown in FIG. 9B is defined as:

$g(x)=\sin 2\pi x/L$ for $0<x<L$, $g(x)=-\sin 2\pi x/L$ for $-L<x<0$ and the Fourier expansion for this waveform is given by:

$$g(x)=\sum_{n=1,3,5\ldots}^{\infty}\frac{8}{(4-n^2)\pi}\cos\frac{n\pi x}{L}$$

For comparison, we shall consider a rectangular wave defined as:

$g(x)=-1$ for $-L<x<-L/2$, $g(x)=1$ for $-L/2<x<L/2$, $g(x)=-1$ for $L/2<x<L$ whose Fourier expansion is given by:

$$g(x)=\frac{4}{\pi}\sum_{n=1,3,5\ldots}^{\infty}\frac{1}{n}\cos\frac{n\pi x}{L}$$

So it will be appreciated that the amplitude coefficients of the waveform shown in FIG. 9B decrease far more rapidly as the frequency increases than those of a rectangular wave. In other words, in the waveform shown in FIG. 9B, the power is concentrated into the lowest frequency components.

Thus, for sinusoidal data waveforms (and also for the waveforms of FIGS. 4C, 4D, 4E and 4F but slightly less so) the problem of pixel pattern dependent heating is considerably reduced.

FIG. 10 shows a block schematic diagram of a test rig to test the teachings of the present invention using a ferroelectric liquid crystal array device 10. A sinusoidal data waveform at a frequency of 10 kHz was applied to all of the column electrodes 16 while the row (strobe) electrodes 22 were grounded. A number of temperature measurement points were established substantially along a centre line between the strobe electrode attachments at progressively greater distances from the edge at which the data signal was applied. A rectangular wave of the same frequency and the same rms voltage was applied to the test rig for comparison purposes. The results, measured after the panel had come to equilibrium, are shown in FIG. 11.

Figure 11:
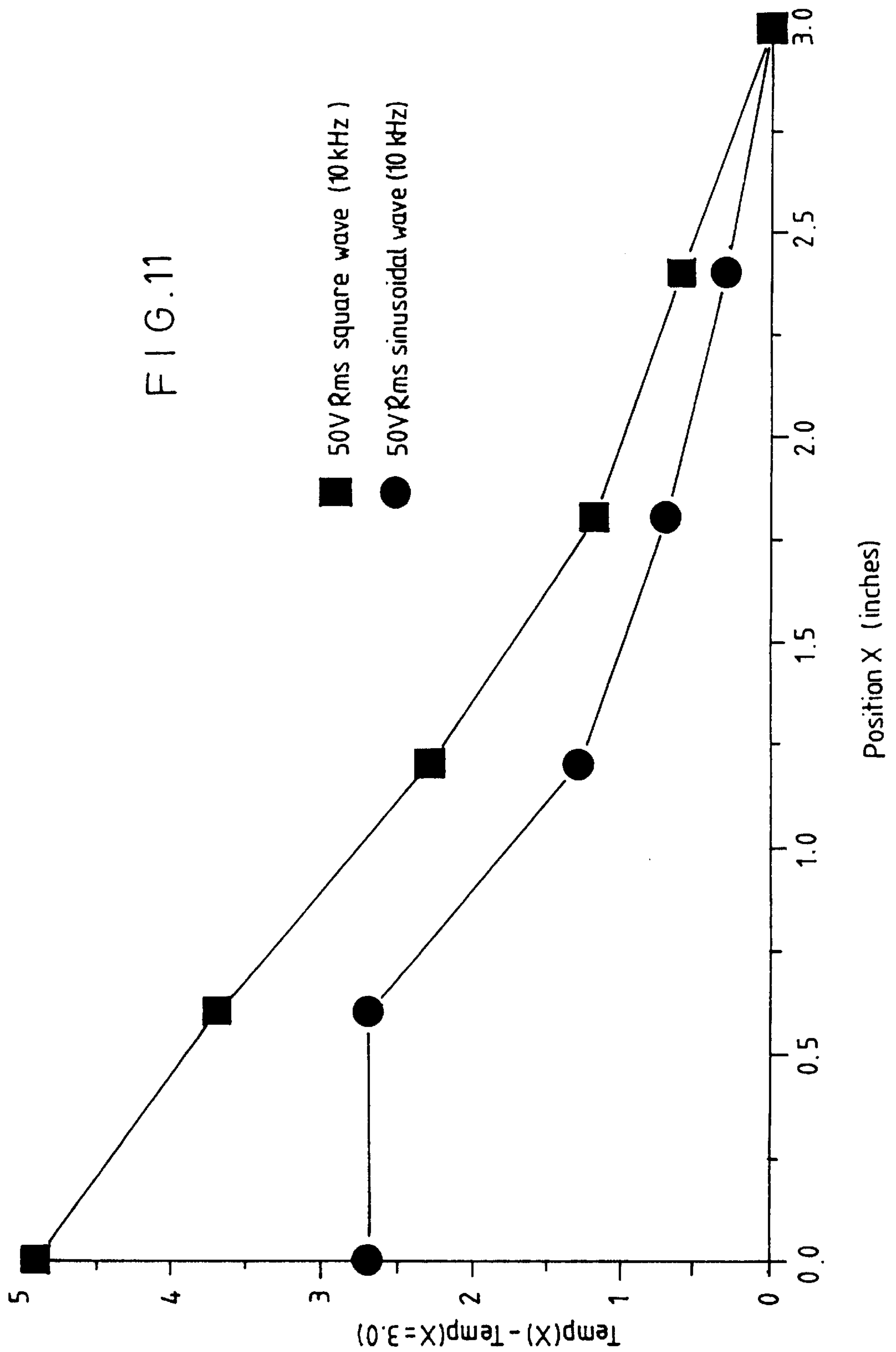
FIG. 11 shows a graph of temperature variation against distance from the edge of a ferroelectric liquid crystal array panel for a prior art drive scheme and a drive scheme in accordance with the present invention.

FIG. 11 shows a graph of temperature increase in degrees centigrade on the vertical axis against distance from the driven edge of the panel for the two waveforms. The sinusoidal waveform gave the temperature effects shown in the curve having a number of solid circles and the rectangular waveform gave the temperature effects shown in the curve having a number of solid squares. For the edge of the panel, the rectangular waveform resulted in a temperature rise of nearly double that resulting from the sinusoidal waveform. For the temperature-sensitive ferroelectric liquid crystal display panel this is particularly significant.

The expression "Temp(x)–Temp(x=3.0)" of the axis of the ordinate of the graph represents values obtained by subtracting the temperature at the position 3.0 (the position 3.0 distant from 0.0) from the temperature at the position x (the position x distant from the position 0.0).

As mentioned previously, waveforms suitable for use in the present invention may be defined in terms of their power dissipation or their waveform distortion. Considering power dissipation, where low distortion is assumed, the power of a sinusoidal waveform is of the form:

$$\langle P\rangle=\omega^2C^2V^2R$$

while for a rectangular wave the power is of the form:

$$\langle P\rangle=\omega CV^2$$

where C is the panel capacitance, R is the sheet resistance of the column (data) electrodes, ω is the angular frequency and V is the amplitude of the data waveforms.

These equations can be combined to give a generalised approximation to the power of a waveform as:

$$\langle P\rangle=CV^2\omega(RC\omega)^n$$

where n=0, 1 are the rectangular and sin wave limits

Other waveforms such as triangular and so on will have values of n somewhere between these two limits.

Another parameter that affects the heating performance of the data waveforms is the number of slots m in the data pulse. The display panel under consideration has a diagonal of 1 meter. Using these parameters, a suitable data waveform would satisfy the inequality:

$$[CV^2m/(2\ \text{l.a.t.})][\pi RCm/(2\ \text{l.a.t.})]^n<100 \text{ for } 0<n\leqq 1$$

while a waveform satisfying the inequality:

$$[CV^2m/(2\ \text{l.a.t.})][\pi RCm/(2\ \text{l.a.t.})]^n<50 \text{ for } 0<n\leqq 1$$

gives improved performance. These figures have been derived from suitable compromises between performance and complexity of the driving circuitry, and also from considerations for preventing the heating from reducing the driving margin of the liquid crystal and the uniformity in the image displayed with respect to the l.a.t. for displaying an animation.

When the data waveforms are sinusoidal, heating performance is satisfactory when the inequality:

$$(CVm/2\ \text{l.a.t.})^2R<32$$

is satisfied, while improved performance will result if the inequality:

$$(CVm/2\ \text{l.a.t.})^2R<16$$

is satisfied. These figures have been derived from suitable compromises between performance and complexity of the driving circuitry, and also from considerations for preventing the heating from reducing the driving margin of the liquid crystal and the uniformity in the image displayed with respect to the l.a.t. for displaying an animation.

When the distortion of the waveforms along the column electrodes of the array are considered, if the data waveforms include sinusoidal waveforms, the following inequality should be satisfied:

$$CRm/(2\ \text{l.a.t.})<0.25$$

where the parameters are as defined above. Improved performance will result if the following inequality is satisfied:

$$CRm/(2\ \text{l.a.t.})<0.15$$

which is particularly significant if the lowest possible l.a.t. is to be used with a ferroelectric liquid crystal display panel (for the fastest possible addressing). When the l.a.t. is longer than the minimum possible value then the effect of waveform distortion on performance of the panel becomes less significant. The above restrictions on waveform distortion will be particularly significant is the l.a.t. is reduced below 10 μs (for example 7.5 μs) for a large area ferroelectric liquid crystal device panel.

Again, these figures have been derived from suitable compromises between performance and complexity of the driving circuitry, and also from considerations for preventing the heating from reducing the driving margin of the liquid crystal and the uniformity in the image displayed with respect to the l.a.t. for displaying an animation.

The invention being thus described, it will be obvious that the same may be varied in many ways. Such variations are not to be regarded as a departure from the spirit and scope of the invention, and all such modifications as would be obvious to one skilled in the art intended to be included within the scope of the following claims.

What is claimed is:

1. A ferroelectric liquid crystal device, comprising:

a liquid crystal layer of ferroelectric liquid crystal material contained between a pair of substrates;

a first plurality of electrodes and a second plurality of electrodes defining a plurality of addressable liquid crystal pixels; and a driving arrangement for applying a first signal in succession to the first plurality of electrodes and for applying a plurality of second signals simultaneously to the second plurality of electrodes, wherein the first signal comprises a substantially rectangular wave signal, and the plurality of second signals comprise non-substantially rectangular wave signals which have a lower harmonic content than the substantially rectangular wave.

2. A ferroelectric liquid crystal device as claimed in claim 1, wherein the plurality of second signals have no effective harmonic content above the fifth harmonic of the fundamental.

3. A ferroelectric liquid crystal device as claimed in claim 1, wherein the second signals comprise signals having a substantially continuously varying level.

4. A ferroelectric liquid crystal device as claimed in claim 1, wherein the second signals comprise sinusoidal signals.

5. A ferroelectric liquid crystal device as claimed in claim 1, wherein the second signals comprise triangular signals.

6. A ferroelectric liquid crystal device as claimed in claim 1, wherein the second signals comprise trapezoidal signals.

7. A ferroelectric liquid crystal device as claimed in claim 1, wherein the ferroelectric liquid crystal device is a display panel having a diagonal measurement of 1 meter, and the driving arrangement outputs the second signals which satisfy the inequality:

$$\{CV^2m/(2\ \text{l.a.t.})\}\{\pi RCm/(2\ \text{l.a.t.})\}^n<100$$

for some n greater than 0 and less than or equal to 1, in which C is the device capacitance, V is the amplitude of the second signals, m is the number of slots in the second signals, l.a.t. is the line address time of the device, and R is the sheet resistance of the second plurality of electrodes.

8. A ferroelectric liquid crystal device as claimed in claim 7, wherein the inequality:

$$[CV^2m/(2\ \text{l.a.t.})][\pi RCm/(2\ \text{l.a.t.})]^n<50$$ for some n greater than 0 and less than or equal to 1 is satisfied.

9. A ferroelectric liquid crystal device as claimed in claim 7, wherein the second signals comprise sinusoidal signals and the inequality:

$$(CVm/2\ \text{l.a.t.})^2R<32$$

is satisfied.

10. A ferroelectric liquid crystal device as claimed in claim 8, wherein the second signals comprise sinusoidal signals and the inequality:

$$(CVm/2\ \text{l.a.t.})^2R<16$$

is satisfied.

11. A ferroelectric liquid crystal device as claimed in claim 1, wherein the second signals comprise sinusoidal signals and the inequality:

$$CRm/(2\ \text{l.a.t.})<0.25$$

is satisfied in which C is the device capacitance, R is the sheet resistance of the second plurality of electrodes, m is the number of slots in the second signals and l.a.t. is the line address time of the device.

12. A ferroelectric liquid crystal device as claimed in claim 11, wherein the inequality:

$$CRm/(2\ \text{l.a.t.})<0.15$$

is satisfied.

13. A ferroelectric liquid crystal device as claimed in claim 1, wherein the second plurality of electrodes each comprises a non-transparent electrode as a low resistance element alongside the transparent electrode.

14. A ferroelectric liquid crystal device as claimed in claim 1, wherein the device comprises a large area ferroelectric liquid crystal display device.

15. A ferroelectric liquid crystal device as claimed in claim 1, wherein the R.M.S. voltage of each of the plurality of second signals is less than 20 volt.

16. A ferroelectric liquid crystal device as claimed in claim 1, wherein the driving arrangement includes:

a waveform generator for providing the plurality of second signals with the fundamental comprising a first waveform that causes the pixel to change state and a second waveform that leaves the pixel in the original state, and an output control circuit for controlling outputs of the first waveform and the second waveform to the second plurality of electrodes.

17. A ferroelectric liquid crystal device as claimed in claim 16, wherein the waveform generator includes:

a first memory and a second memory for containing digital data on the first waveform and the second waveform respectively, and a first digital to analogue converter and a second digital to analogue converter for converting the digital data out of the first memory and the second memory to analogue signals respectively, wherein the output control circuit includes:

a data source for providing, for each of the plurality of the first electrodes, data on the state of the pixels corresponding to one of the first plurality of electrodes that is addressed by the driving arrangement, and a plurality of analogue switches for selectively outputting the analogue signals out of the first digital to analogue converter and the second digital to analogue converter to the second plurality of electrodes according to the data.

18. A ferroelectric liquid crystal device as claimed in claim 17, wherein the output control circuit further includes a shift register for distributing the data out of the data source to the plurality of analogue switches.

19. A ferroelectric liquid crystal device as claimed in claim 17, wherein the data source outputs the data to the respective analogue switches.

20. A ferroelectric liquid crystal device as claimed in claim 16, wherein the waveform generator includes:

a memory for containing digital data on the first waveform, a digital to analogue converter for converting the digital data to an analogue signal, an inverting buffer for generating the second waveform by inverting the analogue signal, wherein the output control circuit includes:

a data source for providing, for each of the plurality of the first electrodes, data on the state of the pixels corresponding to one of the first plurality of electrodes that is addressed by the driving arrangement, and a plurality of analogue switches for selectively outputting the analogue signal and the inverse of the analogue signal to the second plurality of electrodes according to the data.

21. A driving circuit for a ferroelectric liquid crystal device which device comprises a matrix of liquid crystal cells addressable via a plurality of row electrodes and a plurality of column electrodes, the driving circuit comprising:

row driving means for applying a first signal in succession to the plurality of row electrodes; and column driving means for simultaneously applying a plurality of second signals, which second signals each comprise one of at least two data signals, to the plurality of column electrodes, wherein the row driving means comprise means for applying a substantially rectangular wave signal to the plurality of row electrodes, and at least the means for applying a plurality of second signals provides a signal, at least a portion of which signal has a substantially continuously varying level.

22. A driving circuit as claimed in claim 21, wherein the plurality of second signals have no effective harmonic content above the fifth harmonic of the fundamental.

23. A driving circuit as claimed in claim 21, wherein the second signals comprise signals having a substantially continuously varying level.

24. A driving circuit as claimed in claim 21, wherein the second signals comprise sinusoidal signals.

25. A driving circuit as claimed in claim 21, wherein the second signals comprise triangular signals.

26. A driving circuit as claimed in claim 21, wherein the second signals comprise trapezoidal signals.

27. A driving circuit as claimed in claim 21, wherein the plurality of second signals each have an R.M.S. voltage not exceeding 20 volt.

28. A method of driving a ferroelectric liquid crystal device which device comprises a matrix of liquid crystal cells addressable via a plurality of row electrodes and a plurality of column electrodes, the method comprising:

driving the rows of the device by applying a first signal in succession to the plurality of row electrodes; and driving the columns of the device by simultaneously applying a plurality of second signals to the plurality of column electrodes, which second signals each comprise one of at least two data signals, wherein the first signal applied to the plurality of row electrodes comprises a substantially rectangular wave signal, and at least a portion of the data signals has a substantially continuously varying level.

29. A method as claimed in claim 28, wherein the plurality of second signals have no effective harmonic content above the fifth harmonic of the fundamental.

30. A method as claimed in claim 28, wherein the second signals comprise signals having a substantially continuously varying level.

31. A method as claimed in claim 28, wherein the second signals comprise sinusoidal signals.

32. A method as claimed in claim 28, wherein the second signals comprise triangular signals.

33. A method as claimed in claim 28, wherein the second signals comprise trapezoidal signals.

34. A method as claimed in claim 30, wherein each of the plurality of second signals has an R.M.S. voltage of less than 20 volts.

* * * * *

UNITED STATES PATENT AND TRADEMARK OFFICE

CERTIFICATE OF CORRECTION

PATENT NO. : 6,215,533 B1
DATED : April 10, 2001
INVENTOR(S) : Shigeta et al.

It is certified that error appears in the above-identified patent and that said Letters Patent is hereby corrected as shown below:

Title page,
Item [73], Assignee, please add the additional Assignee,
-- The Secretary of Defense In Her
Britannic Majesty's Government of
the United Kingdom of Great Britain
and North Ireland Hants, United Kingdom --

Signed and Sealed this

Eleventh Day of June, 2002

*Attest:*

JAMES E. ROGAN

*Attesting Officer*

*Director of the United States Patent and Trademark Office*